March 27, 1934.                C. PORTER                    1,952,939
                            ELECTRIC SWITCH
                           Filed May 3, 1933           2 Sheets-Sheet 1

Inventor
Claud Porter.
By William C. Linton.
Attorney

March 27, 1934.  C. PORTER  1,952,939
ELECTRIC SWITCH
Filed May 3, 1933    2 Sheets-Sheet 2
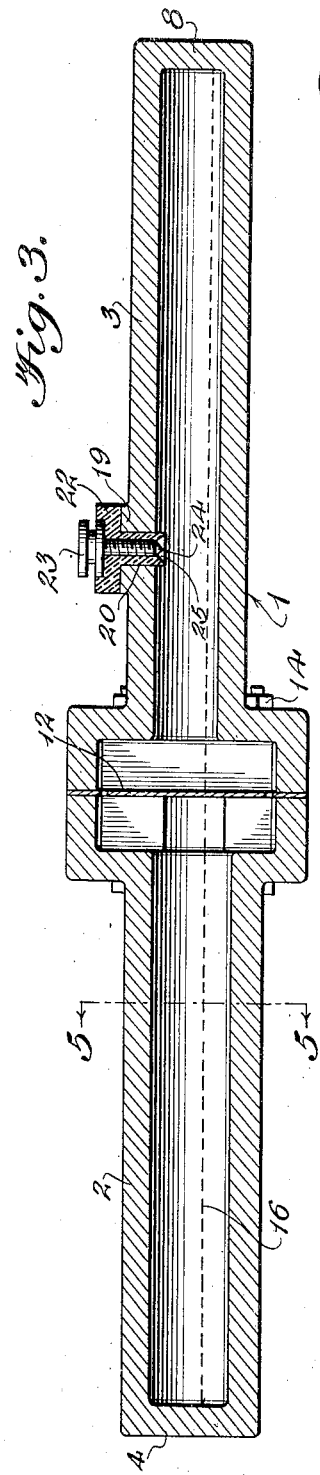
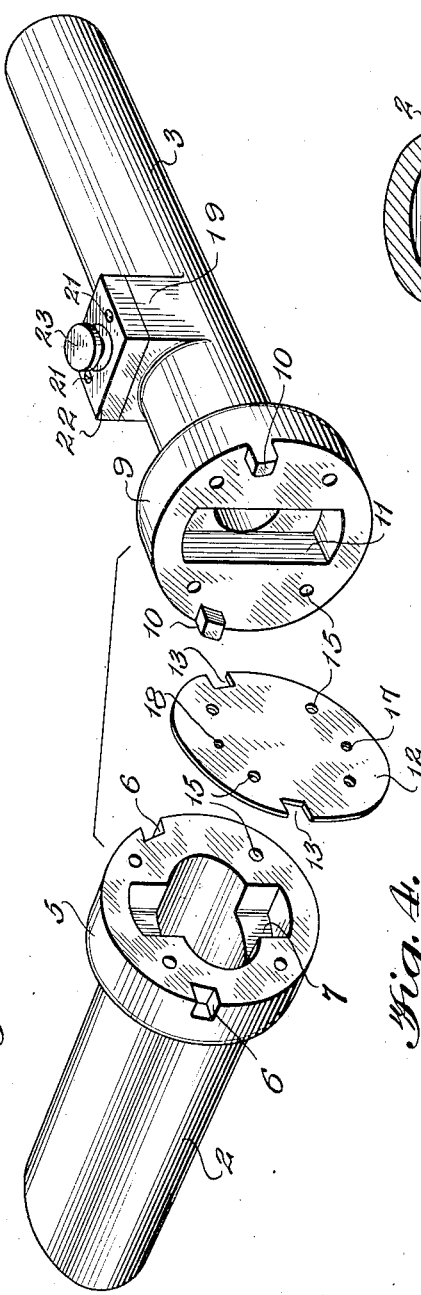
Inventor
Claud Porter
By William C. Linton
Attorney Patented Mar. 27, 1934

1,952,939

UNITED STATES PATENT OFFICE 1,952,939

ELECTRIC SWITCH

Claud Porter, Madison, S. Dak.

Application May 3, 1933, Serial No. 669,239

4 Claims. (Cl. 200—58)

The present invention relates to signals particularly adapted to indicate automatically, a puncture or deflation of pneumatic automobile tires, and has for one of its primary objects to provide means readily attachable to automobiles and positive in action for the purpose intended.

The invention also aims to provide an improved device of the character mentioned having mercury controlled means for warning the automobile operator of a tire deflation, thus affording a simple, accurate and practical realization of such devices.

It is also an important object of the invention to provide an automobile tire puncture signalling apparatus operating through mercury governing device, having means to positively control the actuation of the latter.

Other important objects and advantages of the invention will be in part obvious and in part pointed out hereinafter.

In order that the invention and its mode of operation may be readily understood by those persons skilled in the art, I have in the accompanying drawings and in the detailed description based thereupon, set out the preferred embodiment of the same.

In these drawings:

Figure 3 is an enlarged longitudinal cross section of the contact member;

Figure 4 is a perspective of the disassembled parts of the latter; and

Figure 5 is a section taken on line 5—5 of Figure 3.

Figure 1:
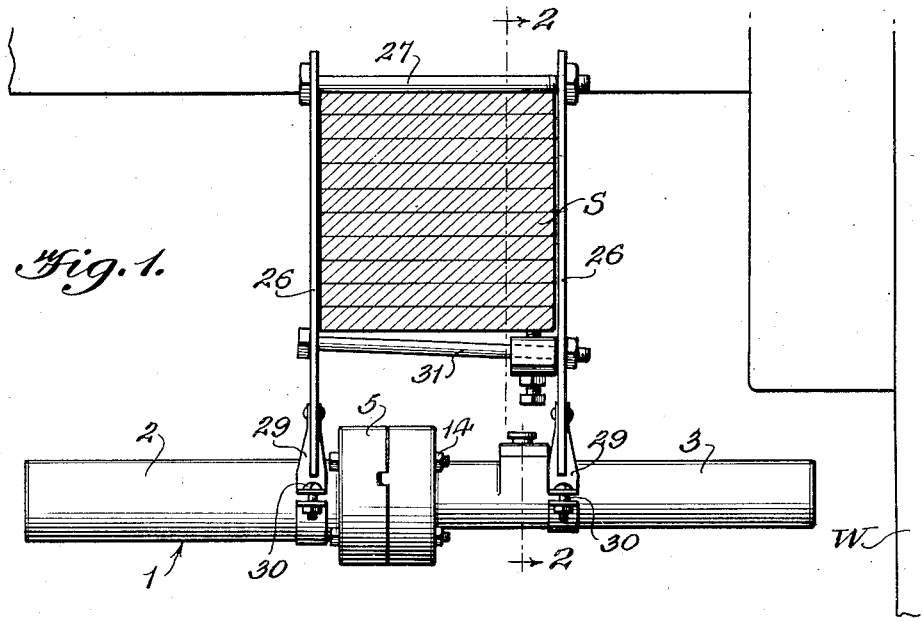
Figure 1 is a side elevation of my improved device, showing the same mounted in position for operation.

Having more particular reference to the drawings wherein like characters of reference will designate corresponding parts throughout, my improved device may be stated to essentially comprise a closed tube 1 consisting of a pair of tubular sections 2 and 3, respectively.

The section 2 is preferably of substantial oval configuration, as more clearly shown in Figure 5 of the drawings, and has a closed end 4, whereas its opposite end is provided with an enlarged circular head 5. A pair of notches 6 are formed in diammetrically opposed relation upon the outer marginal edge of the head 5, while an elongated recess 7 is cut into said head.

The section 3 is preferably of cylindrical formation and also has a closed end 8 and an enlarged circular head 9 formed with its opposite end, the latter cooperating with the head 5 of section 2 to provide coupling means for said sections. At points registering with the notches 6 in the head 5 of section 2, the head 9 of section 3 is provided with a pair of projections 10 extending forwardly from the face of said head 9 and adapted for snug engagement with said notches 6, whereby to lock the sections 2 and 3 in proper interrelation. Cut into the central portion of the head 9, is a recess 11 corresponding to the recess 7 of head 5 of section 2.

Interposed between the coupling heads 5 and 9 of sections 2 and 3, respectively, is a diaphragm or separating disk 12, the latter having a pair of diametrically opposed notches 13 accommodating the projections 10 upon the head 9 of section 3, when joined to the cooperating head 5 of section 2. The notches 13 in said diaphragm or disk 12 also afford means for fixing the same in position between said sections.

The parts, that is, the sections 2 and 3 and the diaphragm or disk 12, may be assembled and rigidly joined together by means of bolts 14 passing through alined apertures 15 bored through adjacent portions of said parts.

The tube 1 constituted by the joined sections 2 and 3, contains a suitable quantity of electric current conducting liquid, such as mercury, which normally attains the level 16 indicated by the dotted line in Figure 3 of the drawings. In order to provide means of communication for controlling the flow of mercury between the separated sections 2 and 3 of the tube 1, a restricted port 17 is practiced in the lower portion of the disk 12 through which port the mercury may flow in a controlled stream, whereas an air vent 18 in the form of a relatively small aperture is provided in the upper portion of said disk 12, said port 17 and air vent 18 thus opening in the chambers defined by recesses 7 and 11 in section heads 5 and 9, respectively.

Upon the upper portion of the tube section 3 at a suitable point intermediate its ends is formed a block 19 having a transversal opening 20 communicating with the interior of said section 3. Received within the block 19 and secured thereto by means of screws 21 or the like, is a cap 22 of insulating material, carrying a contact post 23 the point 24 of which is exposed to the mercury within the tube section 3. The wall of the insulating cap 22 adjacent the contact point 24, is, however, preferably cupped as shown at 25 for the purpose of preventing the occurrence of contact between the mercury at point 24 except from beneath.

A tube constructed in the manner hereinbefore described is suspended from an automobile frame adjacent each wheel thereof, and for this purpose there is provided a support consisting of a pair of metal straps 26 disposed on each side of the vehicle spring S. The straps 26 are interconnected at their upper ends by means of bolts 27 passing through apertures 28 and over the spring S. The lower end of each strap 26 carries a split band 29 adapted to encircle the tube 1 and firmly clamp the same by tightening of the split band fastening elements such as bolts 30, thus suspending said tube in close proximity to the wheel W.

Carried by the intermediate portion of the straps 26 and disposed adjacent and in substantially parallel relation to the lower portion of the spring S, is a pair of bolts 31. Arranged between the last mentioned bolts 31 and straddling the same at one end portion thereof, is a bridge 32 having a plurality of thumb screws 33 in transverse engagement therewith. The extremities of the thumb screws bear against the under side of the spring S so that upon adjusting said screws, the adjacent strap 26 may be raised or lowered for regulating the level of the tube 1 supported thereby. The adjustment is rigidly maintained by means of lock nuts 34 fixing the thumb screws 33 in relation to the bridge 32.

Figure 2:
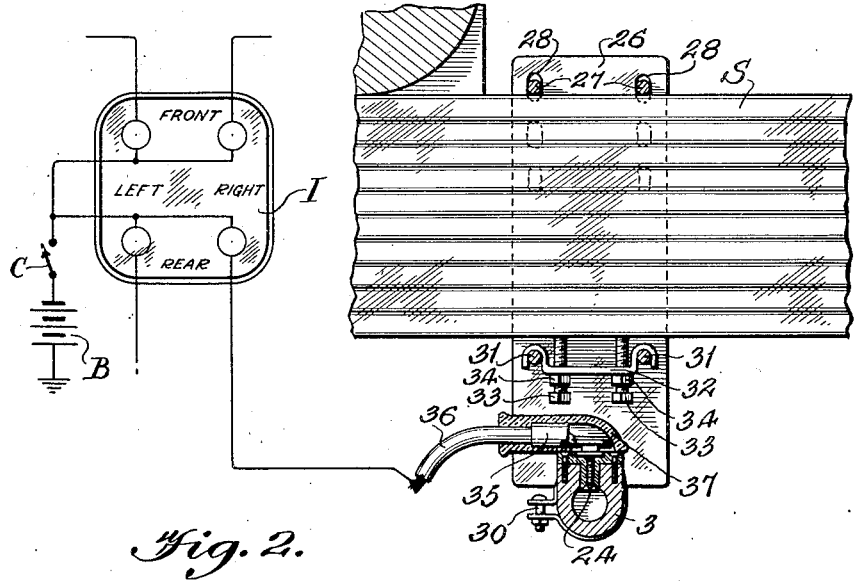
Figure 2 is a section taken on line 2—2 of Figure 1, and further illustrating the manner of connecting the device to the indicator per se.

To allow for the adjustable displacement of the tube level regulating band or strap 26, the apertures 28 receiving the bolts 27 are slightly elongated as clearly shown in Figure 2 of the drawings. Also, the support straps 26 may be provided with a series of such apertures 28 in order to accommodate springs of various thickness.

In engagement with the contact post 23 on section 3 of the tube 1, is a connector clip 35 rigid with a conductor 36 electrically connected to a suitable indicator I in circuit through the switch C with the grounded battery B. The connector clip 35 and contact post 37 may be protected from exposure by means of a casing 37 preferably made of rubberized material and snugly fitted about said parts to be protected.

Of course, it will be understood that the indicator I is to be placed in a position within the vehicle where it will be readily observed by the operator.

In use, the tube 1 being mounted in the manner described, the major portion of the mercury will, under normal conditions, be stored in section 2. In this connection, it will be noted that the inner lower surface of section 2 is at a lower level than that of section 3 so that the mercury will naturally flow into said section 2 out of section 3 leaving the latter practically empty when the tube 1 is in normal substantially horizontal position. The oval configuration of section 2, affording a larger space than that within the cylindrical section 3, will compensate for the additional or increased amount of mercury stored therein.

Due to the fact that very little, if any, mercury is present in the section 3, slight variation in the level of the tube 1 occasioned through travelling of the vehicle over rough roads, will not so appreciably disturb the mercury that the same will form a contact to set the indicator I in operation. Such unwarranted operation of the device is also prevented by reason of the restricted mercury controlled port 17 in the separating disk 12, which port acts to check the flow of mercury from one section to the other.

With deflation of the tire, of course, the tube 1 will assume a slanting angular position causing the mercury to fill section 3 of said tube, thus coming in contact with the point 24 of post 23. This, as it will be understood, closes the circuit to the indicator I warning the operator of the tire deflation.

The progressive flowing of the mercury from one to the other of the separated tube sections 2 and 3, is assured because of the air vent 18 establishing communication between the chambers defined by recesses 7 and 11 in coupling heads 5 and 9 respectively, of the tube sections.

The provision of means intended for the adjustability of the device, allows the same to be adaptable for use with practically all makes of standard automobiles, and further permits to regulate and control the position thereof with that nicety rendering the device most advantageous for proper and accurate operation.

The switch C interposed in the circuit as indicated in Fig. 2 of the drawings is preferably the motor ignition switch, so that when the motor is cut off, the indicator will not operate and in this manner, the battery will be protected against unnecessary discharge should the tire become deflated while the automobile is unattended.

Manifestly, the construction herein shown is capable of considerable modification and such modifications as come within the scope of my claims, I consider within the spirit of my invention.

I claim:—

1. A device for signalling deflation of automobile tires comprising, a tube supported in substantially horizontal position from the vehicle and enclosing a quantity of conducting liquid therein, said tube consisting of a pair of interlocked sections, one of said sections having an inner hollow area larger than the remaining section and further having its inner lower surface at a level lower than that of said remaining section, whereby to cause the enclosed liquid to naturally flow into the first mentioned section when the tube is in normal substantially horizontal position, a contact carried by said remaining section of the tube and adapted to contact with the conducting liquid upon inclination of the tube causing the conducting liquid to flow and accumulate in said remaining section, and means interposed between the tube sections and controlling the flow of the liquid to and from the same.

2. A device for signalling deflation of automobile tires comprising, a tube supported in substantially horizontal position from the vehicle and enclosing a quantity of conducting liquid therein, said tube consisting of a pair of interlocked sections, one of said sections having an inner hollow area larger than the remaining section and further having its inner lower surface at a level lower than that of said remaining section, whereby to cause the enclosed liquid to naturally flow into the first mentioned section when the tube is in normal substantially horizontal position, a contact carried by said remaining section of the tube and adapted to contact with the conducting liquid upon inclination of the tube causing the conducting liquid to flow and accumulate in said remaining section, the adjacent portions of said tube sections having an enlarged head abutting one another and provided with registering recesses forming a chamber, a diaphragm interposed between the heads of said tube sections and partitioning said chamber, and means in said diaphragm establishing communication between the partitioned sections of the chamber whereby to control the flow of said liquid from one section to the other.

3. A device for signalling deflation of automobile tires comprising, a tube supported in substantially horizontal position from the vehicle and enclosing a quantity of conducting liquid therein, said tube consisting of a pair of interlocked sections, one of said sections having an inner hollow area larger than the remaining section and further having its inner lower surface at a level lower than that of said remaining section, whereby to cause the enclosed liquid to naturally flow into the first mentioned section when the tube is in normal substantially horizontal position, a contact carried by said remaining section of the tube and adapted to contact with the conducting liquid upon inclination of the tube causing the conducting liquid to flow and accumulate in said remaining section, the adjacent portions of said sections having an enlarged head abutting one another and provided with registering recesses forming a chamber, a diaphragm interposed between the heads of said tube sections and partitioning said chamber, port means at the lower portion of the diaphragm establishing communication between the partition sections of the chamber for the flow of the liquid from one section of the tube to the other, and other port means at the upper portion of the diaphragm constituting an air vent between the chamber and tube sections.

4. A device for signalling deflation of automobile tires comprising, a tube, a support engageable about the spring of the vehicle and supporting said tube in substantially horizontal position therefrom, means between the support and spring operable to adjust the positioning of the tube with respect to the vehicle, said tube consisting of a pair of interlocked sections, one of said sections having an inner hollow area larger than the remaining section and further having its inner lower surface at a level lower than that of said remaining section whereby to cause the enclosed liquid to naturally flow into the first mentioned section when the tube is in normal substantially horizontal position, a contact carried by said remaining section of the tube and adapted to contact with the conducting liquid upon inclination of the tube causing the conducting liquid to flow and accumulate in said remaining section, means interposed between the tube sections and controlling the flow of the liquid to and from the same.

CLAUD PORTER.